United States Patent [19]

Sery et al.

[11] 3,952,648
[45] Apr. 27, 1976

[54] CHARACTER PRINTING DEVICE

[75] Inventors: Jacques Sery, Vitry (Seine); Serge Andre Emmanuel Couture, Plessis-Robinson, both of France

[73] Assignee: Compagnie Honeywell Bull (Societe Anonyme), Paris, France

[22] Filed: Jan. 18, 1974

[21] Appl. No.: 434,612

[30] Foreign Application Priority Data
Jan. 19, 1973 France .............................. 73.01993

[52] U.S. Cl. ............................................ 101/93.14
[51] Int. Cl.² .......................................... B41D 7/08
[58] Field of Search ............... 101/93, 93.14, 93.13, 101/93.23, 93.28, 93.29, 93.34, 93.01, 111

[56] References Cited
UNITED STATES PATENTS

| | | | |
|---|---|---|---|
| 3,289,576 | 12/1966 | Bloom, Jr. et al ............... | 101/93.14 |
| 3,303,775 | 2/1967 | Giannuzzi ........................ | 101/93.14 |
| 3,443,514 | 5/1969 | Schwartz .......................... | 101/93.14 |
| 3,602,138 | 8/1971 | Barcomb .......................... | 101/93.14 |
| 3,680,480 | 8/1972 | Berglund .......................... | 101/93.14 |
| 3,681,760 | 8/1972 | Salava .............................. | 101/93 X |
| 3,795,186 | 3/1974 | Curtiss et al ................. | 101/93.14 X |
| 3,865,029 | 2/1975 | Lytle ................................ | 101/93.14 |

Primary Examiner—Wm. H. Grieb
Attorney, Agent, or Firm—Diller, Brown, Ramik & Wight

[57] ABSTRACT

A high speed printer receiving line-by-line character data from a computer employs a number of sets of hammers and a belt carrying a number of sets of characters. The belt travels continuously past the hammers and the spacing between characters is greater than the spacing between hammers so that, during one cycle in which all characters of a set have passed successively into alignment with a given hammer, there are a number of scan cycles in which a number of different hammers (one from each set) are aligned with characters a given number of successive subscan times, where the aforementioned number of scan cycles is equal to the number of characters in a set. Thus, the designation of a particular scan cycle for any given hammer uniquely defines the character which will be struck by that hammer during that subscan uniquely related to that hammer. The incoming information which is in sequence according to a print line is converted into a format according to such scan cycles so as to enable a particular hammer to strike only during that scan cycle which will cause the proper character to be struck. In converting the data, a reference memory is employed which is required to contain only that data relating to the set of characters.

15 Claims, 3 Drawing Figures

SCAN CYCLE TO

| t0 | | t1 | | t2 | | t3 | | t4 | | t5 | | t6 | | t7 | |
|---|---|---|---|---|---|---|---|---|---|---|---|---|---|---|---|
| M | K | M | K | M | K | M | K | M | K | M | K | M | K | M | K |
| 0 | 0 | 11 | 9 | 6 | 5 | 1 | 1 | 12 | 10 | 7 | 6 | 2 | 2 | 13 | 11 |
| 16 | 13 | 27 | 22 | 22 | 18 | 17 | 14 | 28 | 23 | 23 | 19 | 18 | 15 | 29 | 24 |
| 32 | 26 | 43 | 35 | 38 | 31 | 33 | 27 | 44 | 36 | 39 | 32 | 34 | 28 | 45 | 37 |
| 48 | 39 | 59 | 0 | 54 | 44 | 49 | 40 | 60 | 1 | 59 | 45 | 50 | 41 | 61 | 2 |
| 64 | 4 | 75 | 13 | 70 | 9 | 65 | 5 | 76 | 14 | 71 | 10 | 66 | 6 | 77 | 15 |
| 80 | 17 | 91 | 26 | 86 | 22 | 81 | 18 | 92 | 27 | 87 | 23 | 82 | 19 | 93 | 28 |
| 96 | 30 | 107 | 39 | 102 | 35 | 97 | 31 | 108 | 40 | 103 | 36 | 98 | 32 | 109 | 41 |
| 112 | 43 | 123 | 4 | 118 | 0 | 113 | 44 | 124 | 5 | 119 | 1 | 114 | 45 | 125 | 6 |
| 128 | 8 | 139 | 17 | 134 | 13 | 129 | 9 | 140 | 18 | 135 | 14 | 130 | 10 | 141 | 19 |
| 144 | 21 | 155 | 30 | 150 | 26 | 145 | 22 | 156 | 31 | 151 | 27 | 146 | 23 | 157 | 32 |

SCAN CYCLE TO

| t8 | | t9 | | t10 | | t11 | | t12 | | t13 | | t14 | | t15 | |
|---|---|---|---|---|---|---|---|---|---|---|---|---|---|---|---|
| M | K | M | K | M | K | M | K | M | K | M | K | M | K | M | K |
| 8 | 7 | 3 | 3 | 14 | 12 | 9 | 8 | 4 | 4 | 15 | 13 | 10 | 9 | 5 | 5 |
| 24 | 20 | 19 | 16 | 30 | 25 | 25 | 21 | 20 | 17 | 31 | 26 | 26 | 22 | 21 | 18 |
| 40 | 33 | 35 | 29 | 46 | 38 | 41 | 34 | 36 | 30 | 47 | 39 | 42 | 35 | 37 | 31 |
| 56 | 46 | 51 | 42 | 62 | 3 | 57 | 47 | 52 | 43 | 63 | 4 | 58 | 0 | 53 | 44 |
| 72 | 11 | 67 | 7 | 78 | 16 | 73 | 12 | 68 | 8 | 79 | 17 | 74 | 13 | 69 | 9 |
| 88 | 24 | 83 | 20 | 94 | 29 | 89 | 25 | 84 | 21 | 95 | 30 | 90 | 26 | 85 | 22 |
| 104 | 37 | 99 | 33 | 110 | 42 | 105 | 38 | 100 | 34 | 111 | 43 | 106 | 39 | 101 | 35 |
| 120 | 2 | 115 | 46 | 126 | 7 | 121 | 3 | 116 | 47 | 127 | 8 | 122 | 4 | 117 | 0 |
| 136 | 15 | 131 | 11 | 142 | 20 | 137 | 16 | 132 | 12 | 143 | 21 | 138 | 17 | 133 | 13 |
| 152 | 28 | 147 | 24 | 158 | 33 | 153 | 29 | 148 | 25 | 159 | 34 | 154 | 30 | 149 | 26 |

FIG-2

CHARACTER PRINTING DEVICE

BACKGROUND OF THE INVENTION

The present invention concerns a character printing device. This device, used particularly in the field of data processing under the name of belt printer, permits rapid printing of the results of problems solved by a data processing system.

It is known to construct a device in which an endless belt bearing matrices of characters arranged in successive identical series unrolls continuously in front of a line to be printed on a sheet so as to align all the characters with each possible printing position. These characters generally marked by their rank number on the belt, starting from a reference character to which is assigned the rank number zero, and are spaced regularly on the belt. Printing units are arranged facing the belt and are distributed regularly with a spacing different from that of the characters; they are marked by an order number. In the case of a printer, these printing units of an electromechanical type control striking hammers. Such a device comprises a recording memory to record data concerning each character to be printed on a line; said data establish a relation between each character to be printed and its order number in the line to be printed. It further comprises a detection unit which, on one hand, can determine the position coincidences of the striking units and the characters, these coincidences appearing during the unrolling of the belt, and, on the other hand, mark by numbers the constant time intervals called scan periods and subscan periods, a scan being defined as the time separating two coincidences of a character with a predetermined striking unit, a subscan being defined as the time separating the successive groups of coincidences appearing in the course of a scan.

In this known type of printing device, a comparison system is connected to the outputs of the recording memory and to the outputs of the coincidence detection unit, so that in the course of the successive scans and subscans, the detection of identities between the output signals of the recording memory and the output signals of the detection unit causes, owing to the signals appearing at the outputs of this comparison unit, the manipulation of the striking units corresponding to these outputs through the agency of means for activating these striking units.

one of the disadvantages of this type of known device is the necessity for a comparison system in which a memory unit is connected to the read outputs of the recording memory through the intermediary of a coder which is also connected to a memory table containing data relating to the position of each character on the support belt, relative to a reference character. This table necessarily has large capacity since it must comprise as many cells as there are characters on the support belt. For that reason, a portion of the main memory of the data processing system is used for it. The large amount of data concerning the position of the characters on their support belt thus causes a large occupation of cells in the main memory and thereby decreases the utilization capacity of that memory for calculational data.

BRIEF SUMMARY OF THE INVENTION

The present invention concerns a character printing device and more particularly a printer in which the characters supported by matrices are distributed regularly in identical series on an endless belt unrolling in front of the line to be printed opposite printing units. At each instant, a printing system detects the identities that can appear between the data originating from a unit to detect coincidences of characters and striking units and from a memory to record data concerning the characters to be printed and their position; this printing system then controls the striking units corresponding to the equalities detected. In particular, it comprises a reference memory containing data relating to the coincidences of characters and striking units for one of the series of characters, these coincidences appearing in the course of an initial scan period representing the time interval separating two successive coincidences of characters with a single striking unit.

BRIEF DESCRIPTION OF THE DRAWING FIGURES

FIG. 2 is a table indicating the coincidences between characters and printing units in the course of various subscans appearing in the course of a predetermined scan.

DETAILED DESCRIPTION OF THE INVENTION

Figure 1:
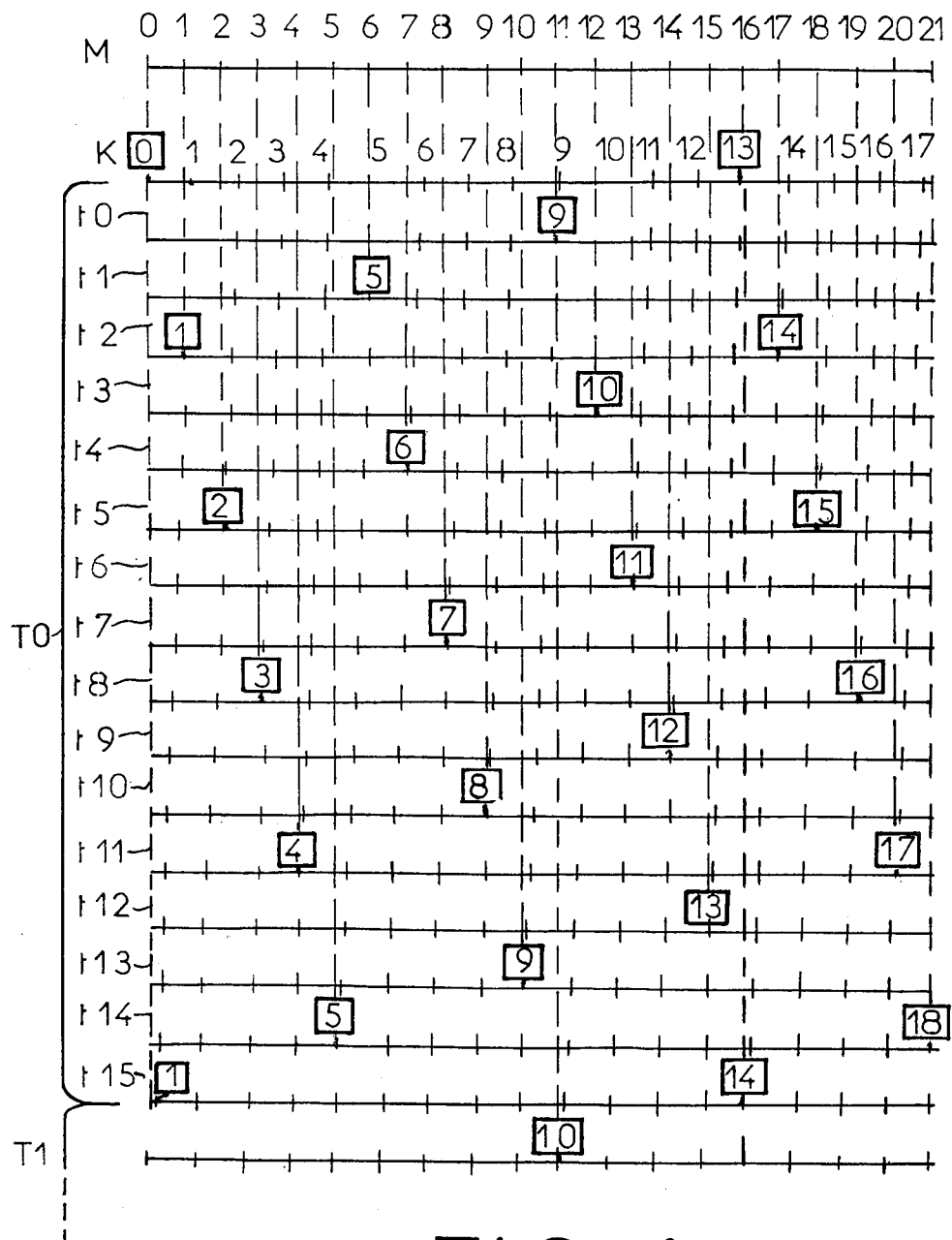
FIG. 1 shows the distribution of characters with respect to the printing units and to be striking hammers during the continuous unrolling of an endless belt supporting the character-holder matrices, for example in a printer.

During the continuous displacement of the endless belt supporting the character-holder matrices, coincidences appear in the positions of the printing units, controlling hammers M, and characters K. Some of these coincidences are represented by way of example in FIG. 1 for the case of a printing device whose endless belt carries four hundred and eighty regularly spaced characters distributed in ten identical series of forty-eight character (i.e. C=48), this endless belt passing continuously opposite one hundred and sixty hammers which are regularly spaced but having a spacing different from that of the characters. The spacings of the hammers and of the characters are so chosen that at a given instant the first hammer, or the first printing unit marked by the order number $N' = 0$, coincides with the first character of a series, marked within this series by the rank number $N = 0$, the hammer number $N' = 16$ then coincides with the character of rank $N = 13$ and so on. Since the belt passes at constant speed in front of the hammers, the time interval $T_n$ separating the coincidences under a same hammer of two characters that follow each other on the belt is designated as a scan. In the example illustrated in FIG. 1 wherein the linear sequence of characters has been entered on the abscissa, this is the time T0 that separates the coincidence under the hammer 0 of the characters of rank 0 and 1. FIG. 1 illustrates all the coincidences that occur in the course of the initial scan T0 for the first twenty-one hammers, starting from the instant when the character of rank 0 is situated opposite the hammer number 0, and the order numbers of the characters in coincidence with the hammers are enclosed in boxes.

Thus, it is possible to define a subscan period as the interval of time that separates two successive strikes of two groups of hammers. In the chosen example, the number of subscans in the course of one scan is equal to sixteen. These subscans marked in the Figure by the reference symbols $t_0, t_1, t_2, t_3, t_4, t_5, t_6, t_7, t_8, t_9, t_{10}, t_{11}, t_{12}, t_{13}, t_{14}, t_{15}$, expose successive groups of hammers which can be activated simultaneously. From FIG. 1, it can be seen that at the beginning of the first subscan $t_0$ the character of rank 0 is opposite hammer number 0, at the beginning of the second subscan $t_1$ the character of rank 9 is opposite hammer number 11, at the beginning of the third subscan $t_2$ the character of rank 5 is opposite hammer 6, and so on. It is evident that if for a series of sixteen hammers there is one hammer-character coincidence for each subscan, then for the entire series of one hundred and sixty hammers there will be ten simultaneous hammer-character coincidences in the course of each subscan, and in the course of the sixteen subscans occurring during one scan there will thus be sixteen groups of ten simultaneous coincidences between hammers and characters. FIG. 2 represents an example of these sixteen groups of ten coincidences between hammers M and characters K in the course of scan T0 and in the order of the subscans $t_0, t_1, \ldots t_{15}$. Thus, in the subscan $t_1$ during the scan $T_0$, hammer number 11 strikes the character of rank 9, hammer number 27 strikes the character of rank 22 and so on until the hammer of rank 155 strikes character 30.

Referring to FIG. 1, we note that in passing from scan $T_0$ to scan $T_1$, hammer number 0 strikes the character of rank 1, hammer number 11 strikes the character of rank 10, and so on. Thus, there is a shift of one unit in the rank of the characters struck by a hammer having a particular order number. This reasoning extends by recurrence to all the coincidences of hammers and characters. Thus, the table of FIG. 2 shows that in scan $T_0$ the character of rank 13 is struck by hammer number 16, from which we deduce that in scan $T_1$ it will be the character of rank 14 that will be struck by this same hammer number 16.

To find the order $n$ of the scan $T_n$ in the course of which a character of rank N must be printed by a hammer or printing unit of order number N′, it suffices to subtract from this rank number the rank number $N_o$ of the character struck by this same hammer N′ in the scan $T_o$, which yields the order n of the scan $T_n$ according to the relation:

$$n = N - N_o, \text{ for } N > N_o, \text{ and}$$

$$n = C + N - N_o, \text{ for } N_o > N,$$

where C is the number of characters in a series.

The relation thus established makes it possible to obtain the table of coincidences of printing units and characters in the course of a scan $T_n$ of any order $n$ from the table established for the scan $T_o$.

Thus, for example, the hammer 16 will strike the character 18 in the course of a scan of order:

$n = 18 - 13 = 5$, or here the scan $T_5$. The subscan within which each hammer may strike is fixed as is shown in FIG. 2. Thus, the order $n$ of a scan uniquely defines the character which a particular hammer may strike.

Figure 3:
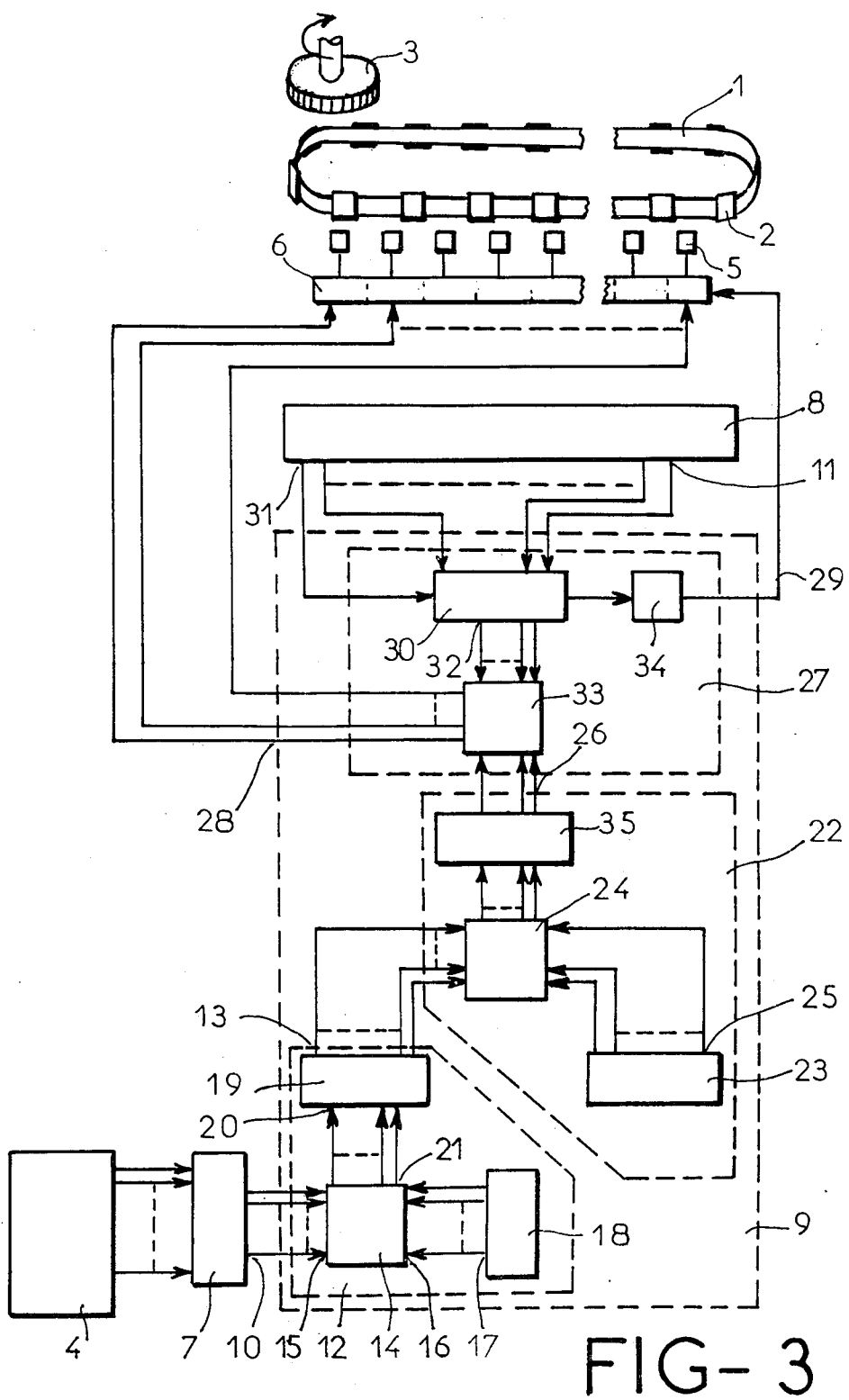
FIG. 3 is a construction diagram of a device according to the invention.

FIG. 3 illustrates an embodiment of a printing device according to the invention. The device comprises an endless belt 1 carrying successive identical series of character-holder matrices 2 which are regularly spaced and unroll continuously in front of the line to be printed on a nonillustrated sheet by rotational drive means 3 which is illustrated schematically in the Figure. Selective character printing units 6 are arranged opposite the endless belt in a number equal to that of the possible printing positions. These units are marked by order numbers corresponding to the possible printing psotions. They can act on striking hammers. The hammer furthest to the left in the Figure, corresponding to the first possible printing position, can be marked by the order number zero, for example. Nonillustrated inking means are provided to assure printing of the sheet when a character is struck by a hammer. It should be noted that the striking hammers, regularly spaced opposite the belt, have a spacing different from that of the characters.

In the case of a belt printer, the printing units 6 activate hammers and consist, for example, of a succession of electromechanical type units, each of these units causing the movement of a hammer each time it receives an electrical signal of determined shape at an input.

The device also comprises a recording memory 7 which makes it possible to record data, originating from a data processing unit 4, concerning the types of characters to be printed on a line and the order numbers N′ of these characters on the line, these order numbers corresponding to those of the hammers.

Thus, the line comprises as many printing positions as hammers, i.e. in the chosen embodiment, one hundred and sixty. If, for example, the letter A must be printed in the eightieth position in the line, it will be hammer number 80 that will strike this letter. The recording memory contains for the letter A binary data concerning the character itself and also data concerning its position in the line.

Near the belt and the striking hammers, the device is furnished with a coincidence detection unit 8 which can be of an electromagnetic type and which makes it possible at each instant to determine the coincidences that appear between the hammers and characters as the belt unrolls. As was described above with the aid of FIGS. 1 and 2, these coincidences appear by successive groups in the course of scan periods $T_n$ marked by numbers $n$ representing the time interval that separates two successive coincidences of characters with a predetermined striking unit, for example hammer number 0, two successive groups of coincidences being separated by the time interval called a subscan period. In the chosen example, the belt supports four hundred and eighty characters distributed in ten identical series of forty-eight characters, passing in front of one hundred and sixty hammers, which according to the table of FIG. 2 yields sixteen successive groups of ten coincidences. Finally, the device comprises a printing-unit control system 9 connected to the outputs 10 of the recording memory 7 and to the outputs 11 of the coincidence detection unit 8. This system 9 controls printing units 6 connected to striking hammers 5 so that, each time an identity appears between a signal present at an output 10 of the recording memroy 7 and a signal present at the output 11 of the coincidence detection unit 8, the system 9 controls the units 6 so as to activate one of the hammers, such as 5, corresponding to these outputs. In fact, any identity between the signals just considered expresses the fact that at a given instant a hammer and a character are in coincidence and that this coincidence corresponds to the data contained in a cell of the recording memory. This means that in the chosen example where the letter A must be printed in the eightieth line position, when this letter arrives at the level of hammer 80 as the belt unrolls, the following operations will have to take place:
1. Detection of the coincidence by the unit 8,
2. Comparison between the detection signal coming from the unit 8 and the data contained in the recording memory.
3. If the comparison has yielded a positive result, the system 9 will control one of the units 6 activating the hammer 80.

The system 9 comprises the following elements which will be described in more detail later in this text.
1. A first coding system 12 which transforms the data concerning the characters to be printed and their order number N' on the line into data concerning the order numbers N' of the characters to be printed and their rank number N in one of the identical series of characters carried by the belt.
2. A second coding system 22 which transforms the preceding data into data concerning the order numbers N' of the characters to be printed and the numbers $n$ of the scans $T_n$ during which these characters must be struck, this data ranked in the order of the subscans.
3. A comparison unit 27 which controls the operation of printing units each time an identity appears between the data coming from the second system and that coming from the coincidence detector.

The first coding system 12 with memories is connected to the read outputs 10 of the recording memory 7. It comprises a coder 14 connected at (15) and at (16) respectively to the outputs 10 of the recording memory 7 and the outputs 17 of a reference memory 18. This reference memory 18 can be a read-write memory, loaded through a unit of a data processing system. It can also be a read only memory, but in both instances it contains data concerning the rank N of the various characters of a series carried by the endless belt. In the chosen example, the reference memory comprises forth-eight cells corresponding to the ranks of the forty-eight characters. The character A which occupies the rank 0 can be marked by binary data concerning this rank; the same holds for all the characters of a series. The coding system 12 further comprises an auxiliary memory 19 whose inputs 20 are connected to the outputs 21 of the coder 14 and which makes it possible to record data concerning the order numbers N' of the characters to be printed on a line and their rank numbers N in a series of characters. This data, which is stored in this memory in the order of the characters to be printed on the line, is available at the read outputs 13 which also constitute the outputs of the coding system 12.

The printing system comprises a second coding system 22 with memories, connected to the outputs 13 of the first system 12. As we have seen, this second system transforms the data contained in the auxiliary memory of the first system into data concerning the numbers N' of the characters to be printed and the numbers $n$ of the scans $T_n$ during which these characters must be struck, this data being ranked in the order of the subscans. In the chosen example, since the character A must be printed in position eighty, the data contained in the auxiliary memory 19 concern the order number of this character on the line, here eighty, and the rank of this character in a series of the endless belt, here 0 for the letter A.

The second coding system 22 transforms this data into data concerning the order number of the character A and the number of the scan $T_n$ in which this character will be struck by the hammer 80. The second system 22 consists of a memory 23, called the "scan memory", which contains data concerning the coincidences of characters in the course of an "initial" scan which can be the scan $T_o$ at the beginning of which the hammer or striking unit of number 0 is in coincidence with the character of rank 0 of a series. This scan memory has one hundred and sixty cells and thus contains data concerning the sixteen groups of ten hammer-character coincidences that appear in the course of this initial scan. This data is ranked in the order of appearance of the sixteen subscans, as shown in the table of FIG. 2. The memory 23 can be a "read only memory" in the event that the detection of coincidences begins only at the instant when a character of predetermined rank in opposite a hammer of predetermined rank, for example when the character of rank zero is opposite hammer number zero. It can also be a "read-write memory" type, loaded by a unit of a data processing system 4 as a function of the number of characters, the number of series of these characters and the number of printing units that the device comprises.

This second coding system also comprises a coder-comparator 24 connected on one hand to the outputs 13 of the first system 12 and on the other hand to the read outputs 25 of the scan memory 23. Knowing the rank $N_o$ of the character struck by a hammer in the course of the initial scan $T_o$, the coder-comparator 24 makes it possible to find the number $n$ of the scan $T_n$ in the course of which a given character will be struck by this hammer. We have seen previously in the text accompanying FIGS. 1 and 2 how this scan number could be calculated theoretically. For example, assuming that the hammer 20 strikes the character 17 during the scan period $T_o$, this same hammer will strike the character 24 during that scan T whose rank will be obtained by determining the difference 24 − 17, i.e. during $T_7$. Similarly, for the case where $N_o > N$, the equation $n = N − N_o + C$ applies, i.e. if for the above hammer 20 same is to print the character B (N=1), then $n = 1 − 17 + 48 = 32$, which corresponds to actuation of this hammer during subscan $t_{12}$ of the $T_{32}$ scan. The coder 24 executes this substraction operation by comparing the data received from the auxiliary memory 19 of the subsystem 12 and that received from the scan memory 23. This operation being executed, the coder-comparator 24 then delivers to an output memory 35 data concerning the order numbers N' of the characters to be printed and the numbers $n$ of the scans in which these characters must be struck. This latter data is stored in the output memory in the order according to which the comparison just described was performed, i.e. in that of the subscans. The read outputs 26 of the output memory 35 constitute the outputs of the second coding system 22.

Finally, the system 9 comprises a comparison unit 27 which receives signals originating from the outputs 11 of the coincidence detection unit 8 and from the outputs 26 of the second coding system 22 and which controls, by the outputs 28 and 29, the printing units 6 activating the striking hammers 5 each time an identity appears between the data received from the output memory 35 of the second system 22 and that received from the coincidence detection unit 8.

The comparison unit 27 comprises a scan counter 30 connected to the outputs 11 of the coincidence detection unit and designed to advance by one unit upon each change of scan number. Its operation is triggered, for example, by electrical pulses received from an output 31 of the coincidence detection unit. For each scan in course, the counter furnishes to the outputs 32 data concerning the coincidence between characters and striking units. An output comparator 33, connected on one hand to the outputs 26 of the output memory 35 of the second coding system and on the other hand to the outputs 32 of the counter 30, compares in the course of each scan the data that appears concerning the coincidences with the data stored in the output memory 35, this comparison being effected in the order of succession of the subscans. For all identities appearing between the data from the outputs 26 of the memory 35 and the data from the outputs 32 of the counter 30, the comparator 33 controls, by the outputs 28, the printing units corresponding to these outputs. For each scan, the characters are struck in the order of the subscans. For that purpose, the printing units 6 activating the striking hammers 5 are synchronized by a reversible counter 34 which is itself synchronized by the counter 30 which supplies it with periodic scan pulses. The characters are thus struck in the order of the subscans, the reversible counter 34 being forced at the beginning to the value 16 since there are sixteen possible subscans. The strike control signals from the output comparator 33 reach the printing units 6 in successive groups of ten, since ten coincidences appear in the course of each subscan. Thus, in the example chosen previously in which the character 24 must be struck by the hammer 20, in the scan $T_7$ and in the subscan $t_{12}$ the corresponding input of the control means of the striking unit corresponding to the hammer 20 will receive a signal of level "one", whereas the other nine inputs corresponding to the other nine hammers in coincidence with nine other characters, in the subscan $t_{12}$, will receive signals of level zero, assuming that none of the hammers 4, 36, 52, 68, 84, 100, 116, 132 or 148 which may strike during the $t_{12}$ subscan of any scan are required to strike the respective characters 11, 37, 2, 15, 28, 41, 6, 19 or 32 during the scan $T_7$.

The advantages of the present invention result principally from the grouping of characters in identical series, which permits the use of a reference memory of reduced capacity, i.e. a reference memory comprising no more calls than each series comprises characters. This reference memory, which according to the invention can be a read only memory, in known devices was a read-write memory which comprised as many cells as the endless belt carried characters. The latter were not grouped in identical series. Thus, it was necessary to record data concerning all the characters and their positions on the belt and not merely data for a single series of characters with their positions. In the embodiment of the device according to the invention, the reference memory has forty-eight recording cells, whereas in the known devices a memory playing the same role would have had four hundred and eighty recording cells. This very-high-performance device makes it possible to achieve striking rates higher than fourteen hundred lines per minute. It is quite evident that in the description just given with reference to the appended Figures, the means utilized could have been replaced by equivalent means assuring the same functions, without departing from the scope of the invention.

It will be appreciated from FIG. 2 that for each hammer there is a unique subscan time which defines the proper moment for hammer striking in any scan cycle. Thus, for any given hammer, the designation of a particular scan cycle will uniquely identify the character which this hammer will strike. The system herein converts the data from the computer, which is in sequence along the print line, to a scan cycle format which will assure that the hammers will be enabled for striking only during that scan cycle corresponding to the character desired. Thus, during any scan cycle $T_n$, the output comparator passes only that information stored in the memory 35 which corresponds to all characters to be struck during that scan cycle. These signals are either a logical "one" (indicating that a character is to be struck by the particular hammer associated with such signal) or logical "zero" and one or the other signal is applied to all hammer striking controls 6. These signals constitute an enabling input to each control and the subscan counter 34 provides ten signals (in the specific embodiment disclosed) simultaneously to these controls during each subscan cycle. Thus, if during a particular scan cycle $T_n$ a particular hammer $M_n$ is to strike, the comparator 33 will provide a logical "one" to such hammer during such scan cycle and when the counter 34 enables such hammer during that subscan uniquely related to such hammer, the hammer will strike. Thus, the counter 34 prepares the hammers cyclically during each scan cycle according to the subscans uniquely associated with them while the coding system determines the scan cycle within which the hammer will strike, thus uniquely defining the character struck by each hammer.

What is claimed is:

1. A character printing device comprising:
   successive series of character-holder matrices, regularly spaced and passing continuously opposite possible printing positions on a line, each character being marked in any one of said identical series by a rank number N counting from a reference character of said series;
   selective character printing units, these units being situated opposite possible printing positions and being marked by order numbers N' counting from a reference printing unit;
   a recording memory to record data concerning the characters to be printed on a line and the order number of these characters on the line;
   a coincidence detection unit to detect coincidences which appear between the print control units and the characters as the latter pass by, these coincidences appearing by successive groups, in the course of scan periods $T_n$ where $n$ represents the numbers of these periods, each of them being the interval of time that separates two coincidences of characters with a predetermined printing unit; and
   a printing-unit control system for said printing units which is connected to the outputs of said recording memory and to the outputs of said coincidence detection unit, and which permits the printing of a character of rank N by a printing unit of order number N' in the course of a scan period $T_n$ in such manner that the relation $$n = N - N_o, \text{ for } N > N_o, \text{ and}$$

$$n = C + N - N_o, \text{ for } N_o > N$$

is satisfied, $N_o$ representing the rank of the character that would be printed by this same unit of number N' in the course of an initial scan $T_o$ and C representing the number of different characters in said series.

2. A character printing device according to claim 1, characterized in that said printing-unit control system comprises:

a first coding system with memories, connected to the read outputs of said recording memory and capable of transforming said data concerning the types of characters to be printed and their order numbers N' on the line into data concerning the order number of characters to be printed and their rank numbers N in one of said identical series;

a second coding system with memories, connected to the outputs of said first system and capable of transforming said data concerning the order numbers N' of the characters to be printed and the rank numbers N in one of said identical series into data concerning the numbers N' of the characters and the numbers $n$ of the scans $T_n$ during which these characters must be struck, this data being ranked in the order of the subscans, the latter representing the time interval separating two successive groups of coincidences;

a comparison unit connected on one hand to said outputs of the detection unit and on the other hand to the outputs of said second coding system and whose outputs control said printing units.

3. A character printing device according to claim 2, characterized in that said first coding system with memories comprises:

a coder connected by a first group of inputs to said read outputs of the recording memory;

a reference memory containing information relating to said rank numbers N of the characters in one of said identical series, the outputs of this reference memory being connected to a second group of inputs of said coder;

an auxiliary memory whose inputs are connected to the outputs of said coder, the outputs of this auxiliary memory constituting said outputs of said coding system and being capable of delivering said data concerning the order numbers N' of the characters to be printed and their rank numbers in one of said identical series.

4. A character printing device according to claim 2 and characterized in that said second coding system with memories comprises:

a scan memory containing data relating to the coincidences appearing in the course of said initial scan $T_o$, this data being ranked in the order of said subscans;

a coder-comparator connected on one hand to said outputs of said first system and on the other hand to the read outputs of said scan memory, said coder-comparator being capable of comparing the data received from said first system with the data received from said scan memory so as to transform it into data concerning the order numbers N' of the characters and the numbers $n$ of scan periods in the course of which these characters must be struck, in the order of the subscans;

an output memory whose inputs are connected to the outputs of said coder-comparator, this output memory being capable of containing said data concerning the order numbers N' of the characters and the numbers $n$ of the scan periods $T_n$ in the course of which these characters must be struck in the order of the subscans, the read outputs of this output memory constituting said outputs of said second coding system.

5. A character printing device according to claim 3, characterized in that said second coding system with memories comprises:

a scan memory containing data relating to the coincidences appearing in the course of said initial scan $T_o$, this data being ranked in the order of said subscans, a coder-comparator connected on one hand to said outputs of said first system and on the other hand to the read outputs of said scan memory, said coder-comparator being capable of comparing the data received from said first system with the data received from said scan memory so as to transform it into data concerning the order numbers N' of the characters and the numbers $n$ of scan periods in the course of which these characters must be struck, in the order of the subscans;

an output memory whose inputs are connected to the outputs of said coder-comparator, this output memory being capable of containing said data concerning the order numbers N' of the characters and the numbers $n$ of the scan periods $T_n$ in the course of which these characters must be struck in the order of the subscans, the read outputs of this output memory constituting said outputs of said second coding system.

6. A character printing device according to claim 2, characterized in that said comparison unit comprises:

a scan counter connected to said outputs of said coincidence detection unit, capable of advancing by one unit upon each change of scan number and of delivering to its outputs data concerning the coincidences between characters and printing units for the scan in course;

an output comparator connected on one hand to said outputs of said second coding system and on the other hand to said outputs of said scan counter, this comparator being capable of detecting the identities in the data that it receives, the outputs of this comparator constituting said outputs of said comparison unit and controlling said printing units.

7. A character printing device according to claim 6, characterized in that said comparison unit further comprises a reversible counter connected by one input to a synchronization output of said scan counter and controlling by an output a synchronization input of said printing units so that these units are activated in the order of said subscans.

8. A character printing device according to claim 3, characterized in that said reference memory is a read only memory.

9. A character printing device according to claim 3, characterized in that said reference memory is a read-write memory loaded by said data concerning said ranks of characters in a series, this data originating from a unit of a data processing system.

10. A character printing device according to claim 4, characterized in that said scan memory is a read only memory, said first scan being that in the course of which the striking unit of order number zero is in coincidence with the character of rank zero in one of said series.

11. A character printing device according to claim 4, characterized in that said scan memory is a read-write memory loaded through the intermediary of a unit of a data processing system during an initial scan.

12. A character printing device according to claim 1 characterized in that said character-holder matrices are supported by an endless belt driven in rotation, said printing units controlling hammers arranged in such manner that a hammer is capable of striking a matrix so as to cause the printing of a corresponding character on a sheet situated between said character and a striking anvil, means being provided to assure the inking of the characters.

13. In a character printing device having a plurality of character-striking members comprising a plurality of sequential sets of members arranged to print a line of characters, said members being equidistantly spaced by a first selected spacing and there being a plurality of character-striking members in each set; character support means movable at a constant velocity parallel to said members and comprising a plurality of sequential sets of characters disposed in equidistantly spaced relation by a second selected spacing greater than said first spacing, each set of characters consisting of a plurality of characters and said first and second spacings being related such that at the beginning of an initial scan time particular characters are aligned respectively with each first character-striking member of each set thereof and such that, at a number of subsequent successive subscan times during said initial scan time, said number being equal to said plurality of characters in a set divided by said plurality of character-striking members in each set, a different character is aligned with a different character-striking member of each set of character-striking members until said first member of each set is aligned with that character next following its associated particular character whereby a number of character-striking members, equal to said plurality of sequential sets of members, are uniquely prepared for striking during each subscan so that all character-striking members may strike all different characters of a set thereof during the course of a number of successive scans equal to said plurality of characters in a set;

- coding means for converting data received sequentially with respect to a print line of characters to a format identical with the alignments of said characters with said character-striking members and including an output memory storing the converted data in subscan order;
- detection means for determining the times of alignments of said characters with said character-printing members; and
- comparison means connected to said detection means and to said output memory for producing control signals for said character-striking members to effect striking thereof during said subscans according to the data received.

14. In a character printing device according to claim 13 wherein said comparison means includes an output comparator connected to said output memory and having output connections to all of said character-striking members, scan counter means connected to said output comparator means for causing said output connections to convey character data to said character-striking members consistent with said number of successive scans, and subscan counter means connected to said character-striking members for enabling said number of character-striking members which are uniquely prepared for striking during each of said subscans.

15. In a character printing device as defined in claim 14 wherein said coding means includes a reference memory storing only that data relating to said s characters of a set thereof.

* * * * *